United States Patent [19]
Mann

[11] Patent Number: 5,828,793
[45] Date of Patent: Oct. 27, 1998

[54] METHOD AND APPARATUS FOR PRODUCING DIGITAL IMAGES HAVING EXTENDED DYNAMIC RANGES

[75] Inventor: Steve Mann, Cambridge, Mass.

[73] Assignee: Massachusetts Institute of Technology, Cambridge, Mass.

[21] Appl. No.: 643,473

[22] Filed: May 6, 1996

[51] Int. Cl.$^6$ ............................. G06K 9/00; G06K 9/36
[52] U.S. Cl. ..................... 382/284; 382/132; 382/294; 348/222; 348/229; 358/448; 358/522; 396/60; 396/61; 396/62
[58] Field of Search ................... 382/132, 294, 382/284; 356/448, 522; 396/60, 61, 62; 348/222, 229

[56] References Cited

U.S. PATENT DOCUMENTS

| | | | |
|---|---|---|---|
| Re. 28,760 | 4/1976 | Marchant et al. ................... | 430/509 |
| 3,647,463 | 3/1972 | Taber et al. ........................ | 430/507 |
| 3,663,228 | 5/1972 | Wyckoff .............................. | 430/506 |
| 3,888,676 | 6/1975 | Warren et al. ..................... | 430/509 |
| 4,647,975 | 3/1987 | Alston et al. ...................... | 348/222 |
| 4,777,122 | 10/1988 | Beltramini ......................... | 430/502 |
| 5,144,442 | 9/1992 | Ginosar et al. .................... | 348/222 |
| 5,162,914 | 11/1992 | Takahashi et al. ................. | 348/229 |
| 5,323,204 | 6/1994 | Wheeler et al. ................... | 396/60 |
| 5,325,449 | 6/1994 | Burt et al. .......................... | 382/284 |

OTHER PUBLICATIONS

Mann, Steve; "Compositing Pictures of the Same Scene," Massachusetts Institute of Technology, Cambridge, MA 02139.

Wyckoff, C.W.;McCue, J.C.; "A Study to Determine the Optimum Design of a Photographic Film for the Lunar Surface Hand–Held Camera," *Edgerton, Germeshausen & Grier, Inc.,* No. B–3076, Jun. 2, 1965.

Wyckoff, Charles W.; "Experimental Extended Exposure Response Film," *Edgerton, Germeshausen & Grier, Inc.,* No. B–321; Mar. 1961.

Stockham, Jr., T.G.; "Image Processing in the Context of a Visual Model," *Proceedings of the IEEE,* vol. 60, No. 7, Jul., 1972.

Mann, Steve; "Lightspace," *MIT Media Laboratory, Information and Entertainment Systems Group,* Dec. 1992.

*Primary Examiner*—Andrew W. Johns
*Assistant Examiner*—Daniel G. Mariam
*Attorney, Agent, or Firm*—Cesari & McKenna, LLP

[57] ABSTRACT

Different exposures of an electronically represented, pictorial scene are combined into a final image having expanded dynamic range yet still capturing subtle differences in exposure. The final image provides increased shadow, midtone and highlight detail notwithstanding the limited response of the system (electronic or photographic) that produced the component images. The invention features automatic identification of optimally exposed regions (on a pixel-by-pixel basis) from the component images, as well as automatic combination into a final image. The invention may also be used to make a camera, of possibly unknown response function, behave as an array of photometric measurement instruments (e.g., an array of light meters) to within a constant scale factor.

16 Claims, 9 Drawing Sheets

METHOD AND APPARATUS FOR PRODUCING DIGITAL IMAGES HAVING EXTENDED DYNAMIC RANGES

FIELD OF THE INVENTION

The present invention relates to processing of electronically encoded images, and in particular to methods and apparatus for improving the dynamic range of such images.

BACKGROUND OF THE INVENTION

Most everyday scenes have a far greater dynamic tonal range than can be recorded on a photographic film or an electronic imaging apparatus (e.g., a still or video camera). This is because photographic media, both photochemical and electronic, exhibit limited response: exposure must be sufficient to induce a chemical transition or be detected electronically, but excessive exposure results in saturation and consequent loss of response. The result is reduced detail in shadow and highlight regions, with deep shadows recorded as undifferentiated black and bright highlights "washed out" as undifferentiated white.

Every photographic medium exhibits a characteristic dynamic range—that is, the tonal gradations it is capable of rendering in response to different amounts of light. A typical photographic film may have a dynamic range of several hundred to one, representing the range of illumination intensities (highlight to shadow) that the film is capable of recording. The "speed" of a film reflects the minimum camera exposure that will yield adequate shadow detail—that is, the onset of the useful recording range. Films having equivalent dynamic ranges may nonetheless differ in terms of their contrast responses. Low-contrast media are formulated to exhibit limited sensitivity to changes in exposure, recording gradually increasing density levels as exposure increases dramatically. The densities of high-contrast media increase more suddenly with small exposure increases.

Camera exposure mechanisms have traditionally attempted to adjust the lens aperture and/or shutter speed to maximize the overall amount of detail that will be recorded. More recent systems, though, incorporate some "intelligence" attempt to identify areas of interest in the scene and adjust exposure to place these well within the photographic medium's dynamic range. Photographers frequently expose the same scene at a variety of exposure settings, later selecting the one exposure that they most prefer; this procedure is called "bracketing".

Unfortunately, proper exposure merely ensures that the system's inherent dynamic response range is well utilized; it cannot expand that range, which represents an inherent property of the photographic medium. As a result, scenes with both strong highlights and important shadow detail cannot be photographically rendered with substantial fidelity. In effect, the photographer must choose which end of the tonal scale to sacrifice. Consider, for example, a photograph of an individual in front of a bright window. Exposing for the person will result in ultimate rendition of the window as a uniformly white background shape, while exposing for the outdoor scene visible through the window turns the person into a black silhouette.

Various attempts have been made to expand the dynamic range of traditional photographic media. For example, increasing the thickness of the film emulsion increases its dynamic response, but at a cost of increased scattering and consequent loss of spatial resolution (i.e., rendition of fine image detail), as well as loss in sensitivity to slightly differing exposures. More than three decades ago, Charles Wyckoff formulated a multiple-layer photographic emulsion in which each layer exhibited different overall sensitivity to light. The Wyckoff film had three layers identical in their spectral sensitivities (that is, unlike color film, none exhibited preferential sensitivity to a particular wavelength over others), differing only in their speeds; the bottom layer was very slow, with an ISO rating of 2, while the top layer was very fast, with an ISO rating of about 600. However, upon processing, the three layers adopted distinct colors (from color dyes) so each could be separately accessed; the result was equivalent to three differently exposed black-and-white pictures.

A picture taken on Wyckoff film can both record a dynamic range of about one hundred million to one and capture very subtle differences in exposure. Furthermore, the film was designed to provide good spatial resolution through the use of a relatively thin emulsion. As a result, the film eliminates to some extent the tradeoff between, on one hand, dynamic range, and on the other, sensitivity to subtle differences in exposure and spatial resolution.

In electronic photography, images are represented as an ordered series of picture elements, or "pixels", arranged in discrete locations on a planar grid. The appearance of each pixel on an output device (such as a display or printer) is specified by data contained in a memory location corresponding to the pixel (which is itself frequently referred to as a pixel), and which is accessible to the output device. If the output device is a display, each pixel will ordinarily specify a luminance or brightness value (i.e., a value monotonically proportional to the amount of light emitted by the display at the pixel location) and chrominance values that specify the color of the pixel in terms of hue and saturation. In digital terms, the dynamic range is typically characterized in terms of image "depth", referring to the number of discrete brightness levels that the system is capable of resolving and displaying. (In an analog system, depth need not be discretized in this fashion.) An eight-bit deep image includes pixels that may assume any of 256 brightness values, while a one-bit deep image refers to a binary image whose pixels are either "on" or "off".

An electronic camera contains an array of light sensors (usually charge-coupled devices) that record the brightness levels of an observed scene and quantize these into a grid of pixels. Like photographic emulsions the sensors exhibit a limited dynamic response range, requiring at least a threshold amount of illumination to activate and saturating above a maximum amount.

In theory, very high spatial resolution can be exploited to increase dynamic range. A sensor array or film with a small number of bits of depth (even one bit) can record a continuous-tone image with good fidelity if the spatial resolution is high enough. This tradeoff between image depth and spatial resolution is utilized in halftoning, whereby an image is processed so that a grayscale can be rendered by single-valued (colored or uncolored) pixels. Unfortunately, as a practical matter, spatial resolution is limited in both electronic and photochemical recording. Both types of systems inevitably exhibit image noise that degrades resolution. Digital recording systems, in particular, exhibit quantization noise that results from assignment of a continuously variable illumination level to one of the allowed discrete pixel values. This type of noise is most pronounced near the threshold and satuaration points—precisely the image region where exposure compensation is most desirable. For example, subtle shadow detail might be binarized between pixel values of 0 and 1 or lost altogether by quantization to a region of pixel values uniformly set to 0.

Clearly, some approach to expanding the dynamic recording range of conventional and digital photographic media would be desirable. One might, for example, attempt to create a composite of differently exposed images of the same scene, utilizing perfectly registered component images or processing them into spatial alignment, then manually pasting the best-exposed portions of each into a final composite image. Unfortunately, this adaptation of Wyckoff's approach would not only prove cumbersome, but also would rarely produce acceptable images. The boundaries between light and dark regions are generally not well defined and, therefore, not easily traced by hand. Moreover, the abrupt changes that result from suddenly switching from one image to another generally introduce unwanted artifacts, even if the various replacement regions can be identified with precision.

DESCRIPTION OF THE INVENTION

Brief Summary of the Invention

The present invention utilizes differently exposed source images to generate a final image having a dynamic range greater than that of any source image, but maintaining sensitivity to subtle differences in exposure. The final image captures detail in shadow, midtone and highlight areas notwithstanding the limited response of the system that produced the component images. Those images need not have particularly high spatial resolution, since the increased image depth is not drawn at the expense of resolution. In effect, the invention selects optimally exposed regions (on a pixel-by-pixel basis) from the component images, and automatically combines these together into a final image. Automatic operation permits the process to occur entirely within the camera, relieving the user of the need to perform manual operations and ensuring the presence of an "objective" photograph that has not been retouched.

Accordingly, in a first aspect, the invention comprises a method of combining a plurality of differently exposed source images of the same object or scene. The invention directly or indirectly establishes a response function relating the source images in terms of their exposures and, based on the response function, combines the images into a composite having a greater range of detail than any of the individual source images. Preferably, the composite image includes the bestexposed portions of each of the source images. In a preferred embodiment, these portions are identified by differentiating the estimated response function to produce a "certainty" function which, as the slope of the response function, characterizes the "step size" (i.e., quantization steps or the like); the more quickly varying the response function for a given exposure, the better will be the ability of the recording medium (film, sensor array, etc.) to capture subtle differences in exposure.

In a second aspect, the invention combines pixels from the source images in a smooth manner, deriving each final pixel value from the values of correspondingly located pixels in each of the source images, so that the final image reflects contributions from each of the source images. In this way, sharp transitions between different exposure regions are avoided. In a preferred embodiment, by weighting each final pixel value toward the value in the best-exposed source image, the invention generates a final image having an expanded dynamic range reflecting an optimal combination of the source images, even if estimates of the response function and overall exposure levels are only approximate. Acceptable images may be produced simply from a very rough estimate of the general trends of the response function.

In a third aspect, the invention operates on source images that are not perfectly aligned, registering these so that overlapping subject matter appears at consistent pixel locations in all source images.

In a fourth aspect, the invention allows the natural variation in overall sensitivity caused by, for example, automatic gain control or autoexposure mechanisms to aid in constructing an image composite of extended dynamic range.

In a fifth aspect, the invention comprises apparatus for performing the foregoing operations.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Image Characteristics and Combination

Figure 1:
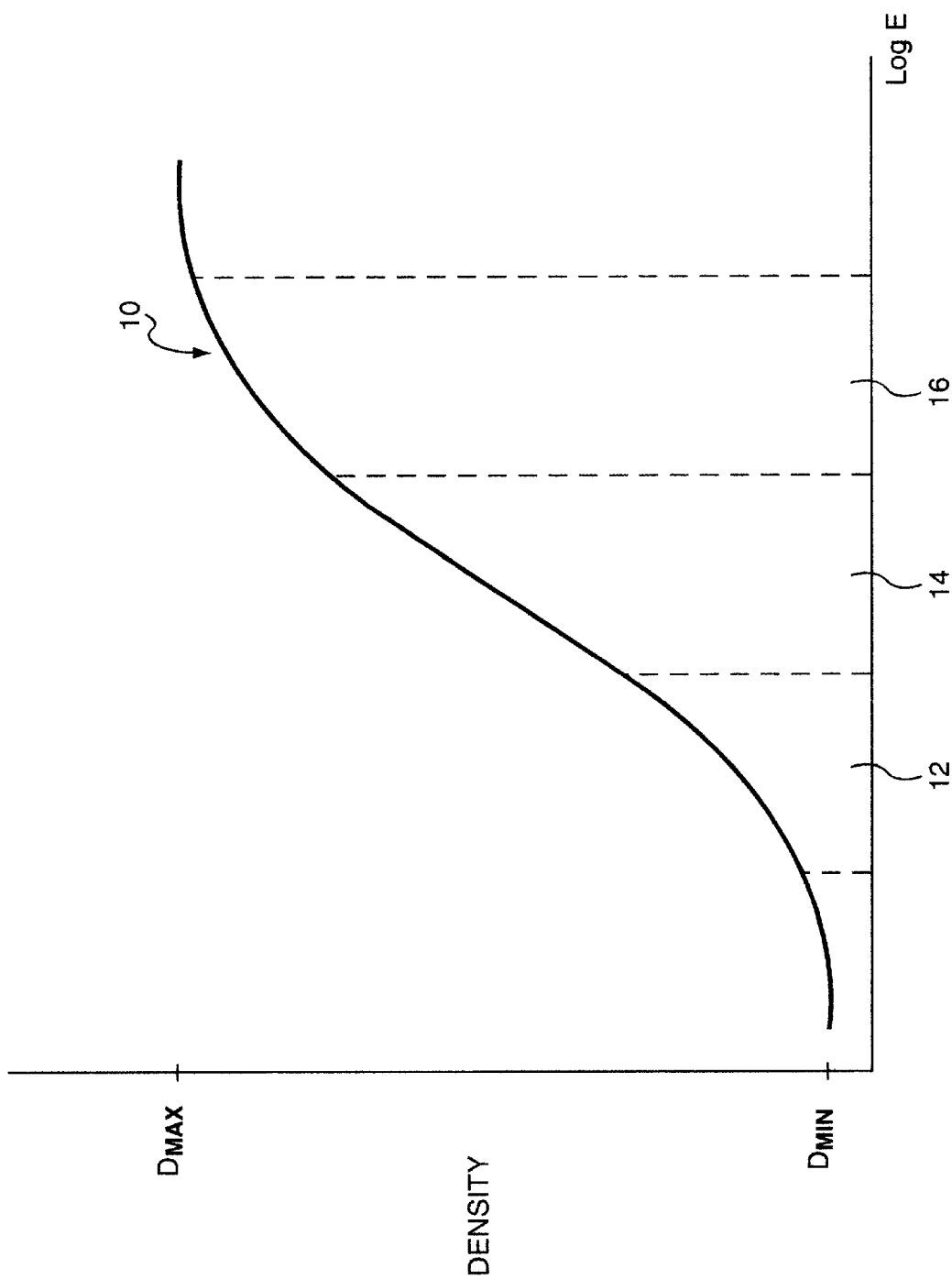
FIG. 1 graphically depicts the relationship between density and logarithmic exposure for a typical photographic film.

Refer first to FIG. 1, which illustrates the response of a conventional photographic film to increasing exposure. The curve 10 relates the increase in density produced by increasing exposure E (plotted on a logarithmic scale). Greater exposure to light results in a darker image (i.e., greater density). The curve consists of a "foot", where it begins to rise; a steep, more-or-less straight-line portion, where density is approximately proportional to log E, representing the material's optimal region of sensitivity to subtle changes in exposure; and the "shoulder", where the curve levels off. The foot of a "fast" film is shifted to the left of the foot of a "slow" film; in other words, the response of fast films begins at relatively lower exposures.

The density of the material ranges from a minimum, $D_{min}$, which in a photographic film represents the emulsion fog (i.e., the density obtained on a material developed without exposure), to a maximum $D_{max}$. The region 12 represents the response region where useful shadow detail is recorded, the region 14 defines the midtones, and the region 1 6 the highlights. Light intensities below region 12 fall below the material's response threshold, while above region 16 the material is saturated and can no longer record intensity differences. Within the steep region 14, the material obeys the canonical equation $D=\alpha+\beta E^\gamma$ where $\gamma$ represents the slope of the log E plot and, hence, the film's contrast.

Electronic cameras behave in a similar manner, although greater exposures may be translated directly into higher output intensities (i.e., pixel luminance values) instead of darkening for increased light, thereby obviating the need for an intermediate negative. The minimum exposure necessary to produce a response is known as the "noise floor"; sensors also exhibit saturation above their detection limits. Performance improves and degrades along a curve analogous to the derivative of that shown in FIG. 1 due to the increased noise levels in regions where the response curve levels off. For convenience of presentation, the ensuing discussion will focus on traditional photographic media, it being understood that electronic imaging equipment would exhibit analogous behavior. Indeed, the curve shown in FIG. 1 is directly relevant to much digitally represented photography, since frequently this originates as a conventional photograph that is scanned and digitized into a pixel array; in this case the analog characteristics of photographic film are directly carried over into the digital domain.

Figure 2:
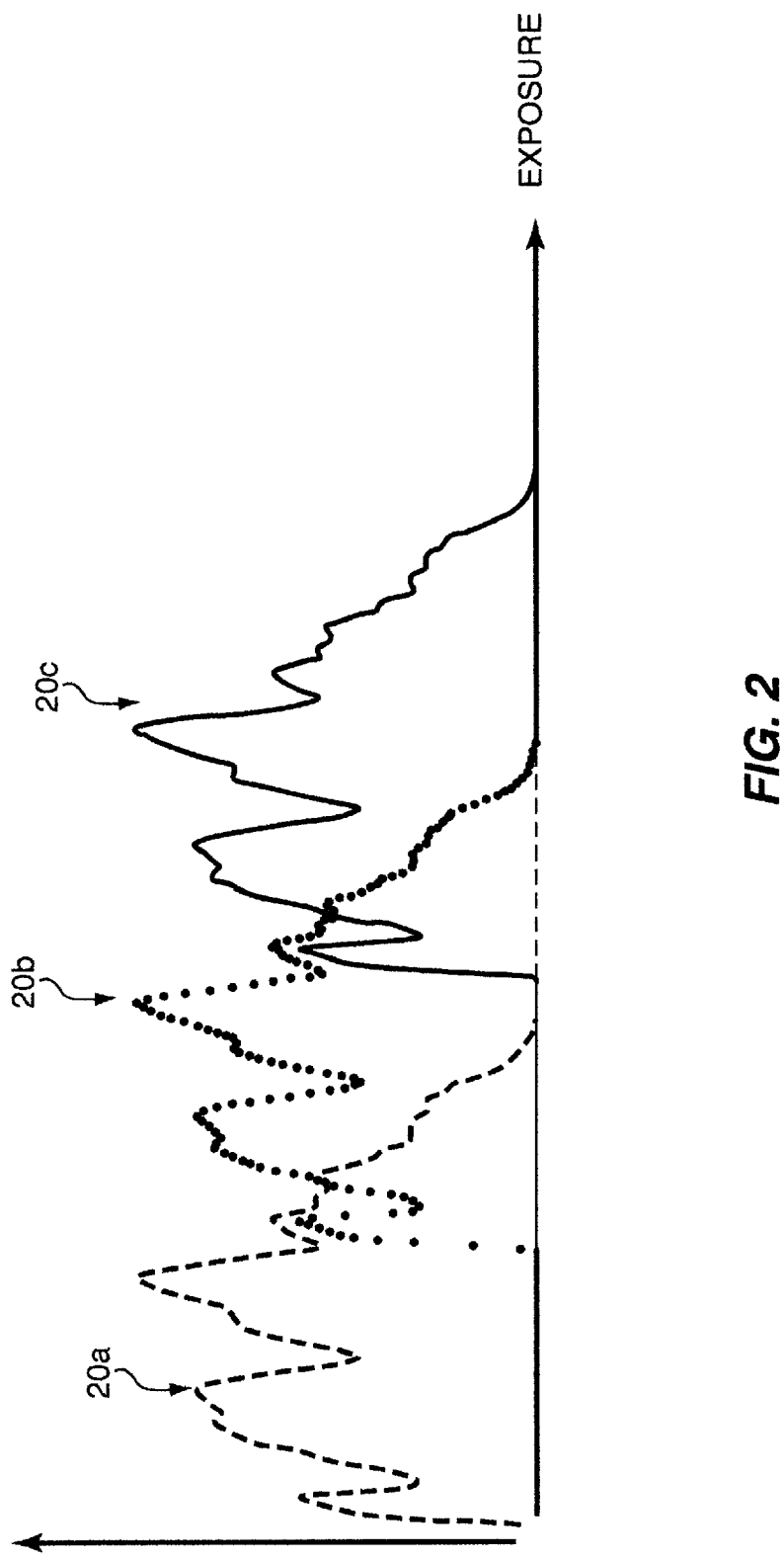
FIG. 2 graphically depicts the exposure distributions of three photographs of the same scene that differ only in exposure.

The Wyckoff film would be represented by three separated curves 10, each having a toe whose distance from the origin reflects its speed. Three different exposures on (successive frames of) the same film, on the other hand, would merely represent different utilizations of the film's recording capabilities as expressed in its single curve. Each differently exposed photograph might, for example, be represented by an effective scene intensity distribution as shown in FIG. 2. Each of the curves 20a, 20b, 20c represents the exposure distribution, as recorded on film or by sensors, produced by different camera settings; the shape of the curves is dictated by the fact that any picture represents a large number of individual exposure levels (in the sense of reflected light intensities reaching the film), since any scene ordinarily contains elements of low, average and high reflectivities; accordingly, even short recording times (as represented by curve 20a) produce some bright highlights and long recording times (as represented by curve 20b) still record some dark shadow regions. Nonetheless, where the majority of the exposures fall, and how the image will be recorded on film, is grossly determined by the recording time. Curve 20a might, for example, represent a shutter speed of 1/500 sec, curve 20b a shutter speed of 1/250 sec, and curve 20c a shutter speed of 1/125 sec at the same aperture setting.

Figure 3:
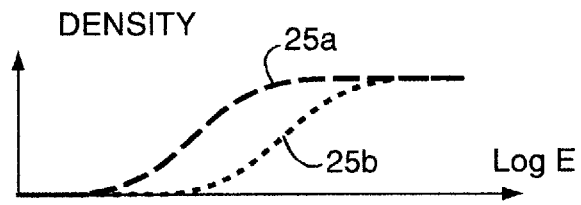
FIG. 3 graphically depicts different "effective" responses of a single recording medium to different exposures.

Alternatively, one can consider exposure not in terms of the film's response, but instead in terms of the camera—that is, the response of the film as constrained by the amount of light admitted by some combination of lens aperture and shutter speed. In these terms, the "effective" exposure can be represented by the curves 25a, 25b in FIG. 3, where curve 25a represents the effective response of the film to light admitted during a relatively long exposure, while curve 25b represents the effective response to a shorter exposure. Measured in these terms, the effective response is analogous to the same exposure taken on films of different speeds; the faster film would exhibit an intrinsic response curve similar to curve 25a, while the slower film's characteristic curve would resemble curve 25b.

As noted previously, parts of the responsive medium (film or sensor array) that are exposed in the extremes (greatly overexposed or greatly underexposed) cannot record detail; small changes in light level cannot be distinguished, since the resulting changes in density or pixel value are too small to be recorded or are overwhelmed by noise. It is exposure falling within the steep portions of the curves that is best rendered. In these regions, small changes in light level will cause large changes in the measured value of the response function, and even if the measurements are highly quantized (e.g., constrained to an eight-bit grayscale), small differences in exposure will remain discernible. Accordingly, to combine the best-rendered portions of different source images, one would extract those portions of each image whose exposures were recorded along the steep, responsive portions of the characteristic curve. Therefore, a preferred embodiment of the invention favors combining pixels whose values in the middle of the response range.

Figure 4:
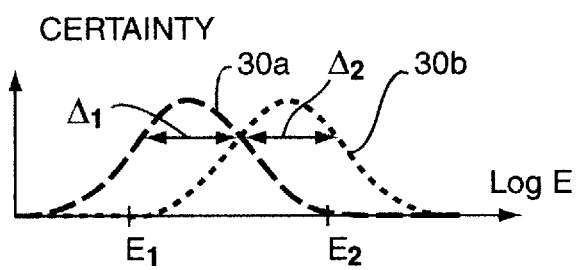
FIG. 4 graphically depicts certainty functions derived from the plots illustrated in FIG. 3.

These portions may be identified in an automated fashion by differentiating the effective exposure curves to produce "certainty" functions that express the exposure-induced density (or pixel value) variation as a function of exposure—that is, which exposure regions are emphasized and how much. This is illustrated in FIG. 4, where the derivatives of curves 25a, 25b are plotted as curves 30a, 30b, respectively. The peak of each certainty curve represents the exposure level recorded most faithfully. By using a series of exposures, relatively small exposure ranges can be selected from each source image; the more densely packed the differently exposed source images that are employed, the smaller will be the amount of information extracted from each and, consequently, the less deviation from peak fidelity. Thus, for example, to produce a composite from the images responsible for the curves shown in FIG. 4 and varying from a minimum exposure $E_1$ to a maximum exposure $E_2$, one utilizes the exposure range $\Delta_1$ in the longer-exposed image and the exposure range $\Delta_2$ from the shorter exposure. In neither case is deviation from the peak significant (whereas deviation would be substantial if either image were considered in isolation). Moreover, the approach is consistent with traditional principles of densitometry, since longer exposures generally yield better shadow detail but contain "blocked" highlights. Highlight detail is better captured in shorter exposures.

Alternatively, it is possible to obtain less precise results with less computational effort by defining an arbitrary certainty function high in the middle and in some sense representative of the response variation as a function of the effective exposure. A simple peak function is suitable for some applications.

The certainty functions identify the best portions of a series of source images, but do not specify the manner in which they are to be combined. One could, of course, simply cut and paste, using the certainty functions to outline the various regions to be extracted. This approach is undesirable for reasons discussed previously. Therefore, in a preferred embodiment present invention, every pixel of a composite electronic image—whether shadow, highlight or midtone—is drawn from the corresponding pixel in each of the input source images according to a weighted average. Preferably, the weighting is based on the certainty function (or even a crude estimate thereof) associated with each source-image pixel corresponding to an output pixel in the final composite image. In this embodiment, the value of the relevant pixel parameter (generally luminance or brightness) for a given final-image pixel is given by $$\frac{\sum_n c_n P_n}{\sum_n c_n}$$

for n source images, where $P_n$ is the pixel parameter and $c_n$ is the certainty function associated with the corresponding pixel of each source image n.

This approach provides a gradual transition between combined image components, where the shadow detail derives primarily (but not exclusively) from the more highly exposed image(s) and the highlight detail from the less-exposed image(s). If the resulting pixel value falls between allowed quantization levels, it may be rounded to the nearest allowed level if an integer output image is desired.

2. Camera Calibration

The foregoing operations presume explicit knowledge of the characteristic response curves of the recording medium—that is, the manner in which image density or a pixel parameter varies with exposure (i.e., the quantity of light falling on each point of the sensor array). Effective exposure curves can be generated quantitatively through experimentation and analysis, exposing, for example, different pieces of the same film to varying, known quantities of light (e.g., a known light source at different camera settings) and evaluating the density response.

Such precision is not, however, necessary for utilization of the invention. Instead, the following technique can be used to establish a relative response function relating electronic images in terms of relative values of a pixel parameter and exposures producing the variations; an explicit relationship between absolute quantities of light and image response is not necessary. The technique recognizes that a numerical pixel value is seldom linearly related to the quantity of light falling on the corresponding sensor element, whether due to nonlinearities in an electronic camera or in a traditional photographic image scanned into a digital representation (in which case the scanner would add further nonlinearity to the nonlinearity of the film). The invention provides a method of finding the pointwise nonlinearity of the entire process f that maps the light q projected on a point in the image plane to the pointwise value in the picture $f(q)$ (i.e., the value of the pixel parameter) up to a constant scale factor.

In one approach, useful for images exhibiting little noise, a relatively dark pixel is first selected from a first source image f, and its location $(x_0, y_0)$ and pixel value $f_0$ observed. The actual quantity of light that gave rise to $f_0$ is unknown, but may be denoted as $q_0$. Since $f_0$ is the result of some unknown mapping, f, applied to the unknown quantity of light $q_0$, the pixel value of the selected pixel, $f(x_0, y_0)$, is denoted by $f(q_0)$.

In a second step, the pixel in a second source image g with the same location $(x_0, y_0)$ as the dark pixel from image a is located. Because some amount k times as much light gave rise to the pixel value $g(x_0, y_0)$ as compared with $f(x_0, y_0)$, it is clear that $g(x_0, y_0)=f(kq_0)$. For convenience, $g(x_0, y_0)$ is denoted by $g(q_0)$, so that $g(q_0)=f(kq_0)$.

In a third step, image f is searched for a pixel having the numerical value $f(kq_0)$. The coordinates $(x_1, y_1)$ and the value $f(q_1)$ of this newly located pixel are noted. Substituting, $f(x_1, y_1)=f(q_1)=f(kq_0)$.

In a fourth step, the value $g(x_1, y_1)$ of the pixel in the second image g at location $(x_1, y_1)$ is observed. Because k times as much light fell on $(x_1, y_1)$ in image g as compared with image f, $g(x_1, y_1)=f(kq_1)=f(k^2q_0)$.

The third step is now repeated for $f(k^2q_0)$, the fourth step for the correspondingly located pixel in image g, and so on.

Figure 5:
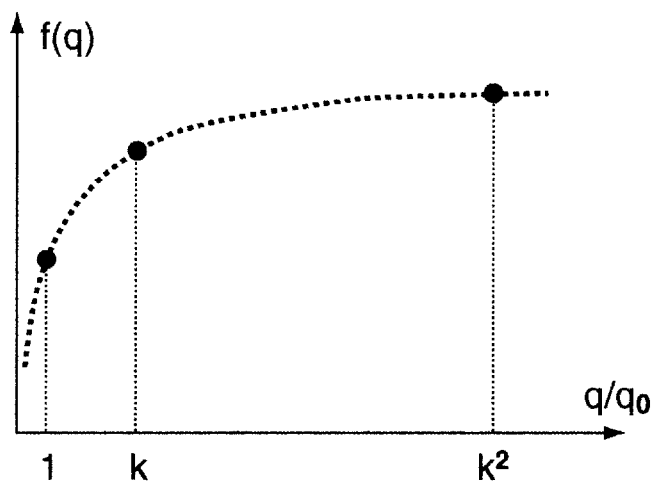
FIG. 5 is a (possibly unknown) response curve plotting effective exposure against pixel output values.

Continuing in this fashion, the nonlinearity of the image sensor is obtained in the form of points relating multiples of an arbitrary quantity $q_0$ of light, $q_0, kq_0, k^2q_0, \ldots, k^nq_0$, against the resulting exposure (pixel parameter values), $f(q_0), f(kq_0), f(k^2q_0), \ldots, f(k^nq_0)$. The value of n—that is, the number of iterations—is based on an acceptable-error criterion or point selection. Dividing by $q_0$ (that is, normalizing the plot to $q_0$) produces the response curve shown in FIG. 5, with $f(q)$ plotted against k. It is not necessary to know $q_0$ (although this quantity could, if desired, be obtained with a single reading from a light meter), since all that is important is the variation in the output pixel parameter $f(q)$ with a known relative variation in q. Differentiating the response curve shown in FIG. 5 to obtain the certainty function upon which image combination will be based eliminates $q_0$ entirely. The certainty curves will be displaced from one another by a factor of k.

In a more general approach, a cross histogram can be generated for each pair of image and used to obtain a parametric plot of $f(q)$ versus $f(kq)$. While a histogram for a single image can illustrate, for example, the distribution of pixel luminances (luminances versus number of pixels having the corresponding luminances), a cross histogram relates the manner in which pixel brightness levels relate to one another in different images. Each point on a cross histogram reflects, for example, the number of pixels of brightness u in image a that correspond to identically located pixels in image b having brightness v. In order to represent numbers of pixels, each point of a cross histogram (called a "bin", with the number of pixels in the bin called the "bin count") is usually represented as a shaded value for ease of comprehension, although other representations (such as numerals indicating the bin count) are equally valid. Consequently, the cross histogram of an image with itself—that is, where k=1—is a diagonal line. In differently exposed images of the same scene, the shape of the cross histogram reflects the exposure differences between the two images. Due to quantization effects and noise, the cross histograms of real-world images generally are not lines; instead they are fuzzy shapes with higher densities—that is, the largest bin counts—clustered along a ridge corresponding to the curve of the parametric plot of $f(kq)$ as a function of $f(q)$.

Figure 6C:
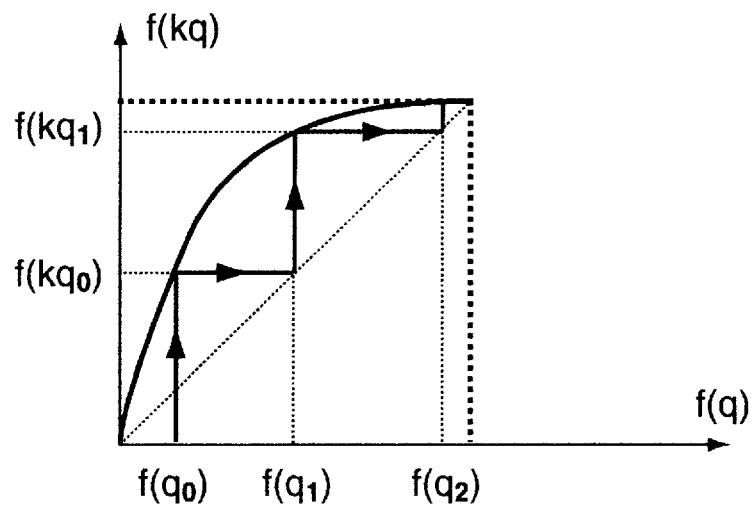
FIG. 6C is a "range-range" plot of pixel value in one image against corresponding pixel values in the other, which is based on the response curve and may be derived from the cross histograms shown in FIG. 6A or 6B.
Figure 6A:
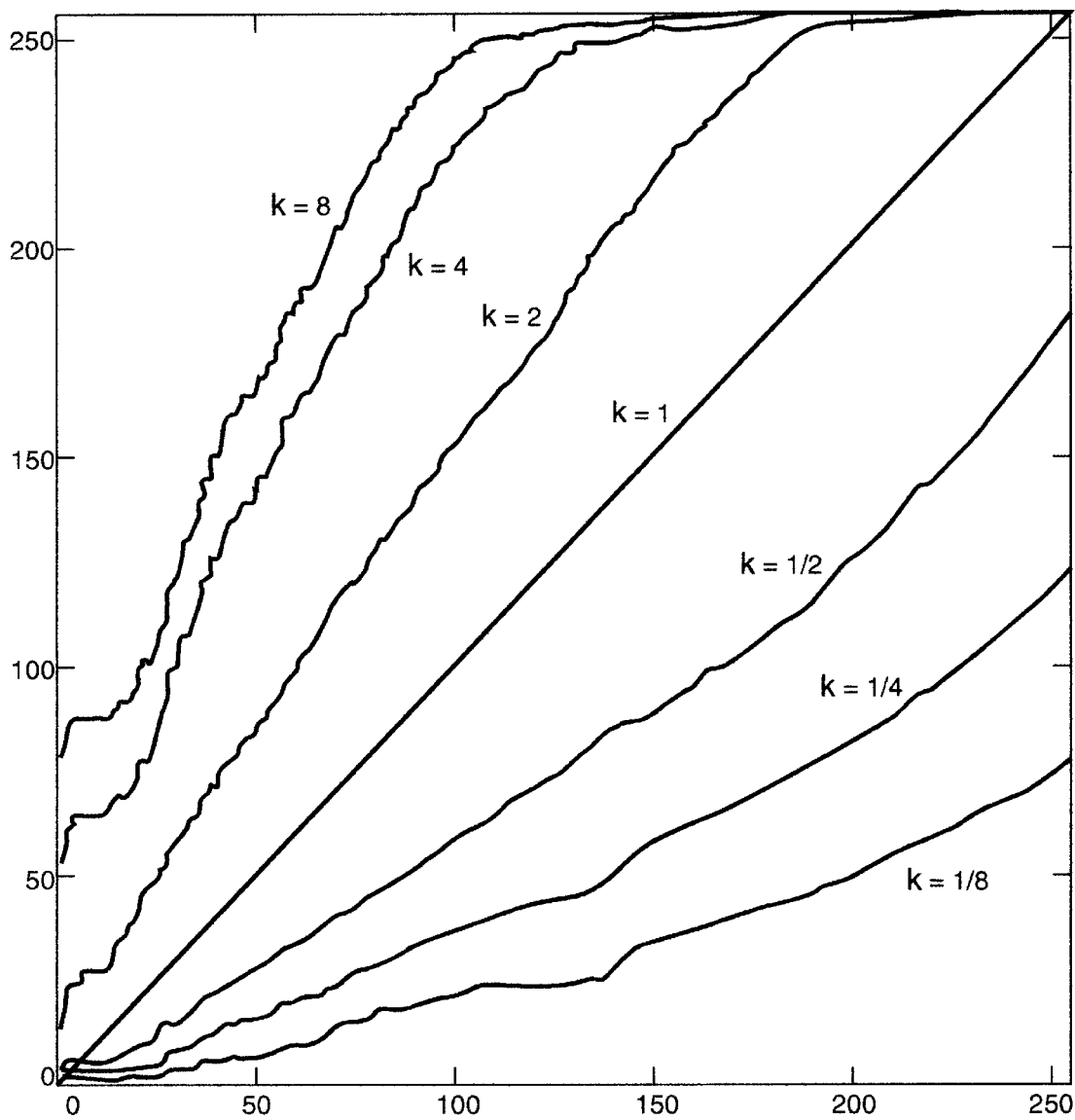
FIGS. 6A and 6B are estimates of idealized cross-histograms, generated in different ways, resulting from comparisons between pictures of the same scene that differ only in exposure.
Figure 6B:
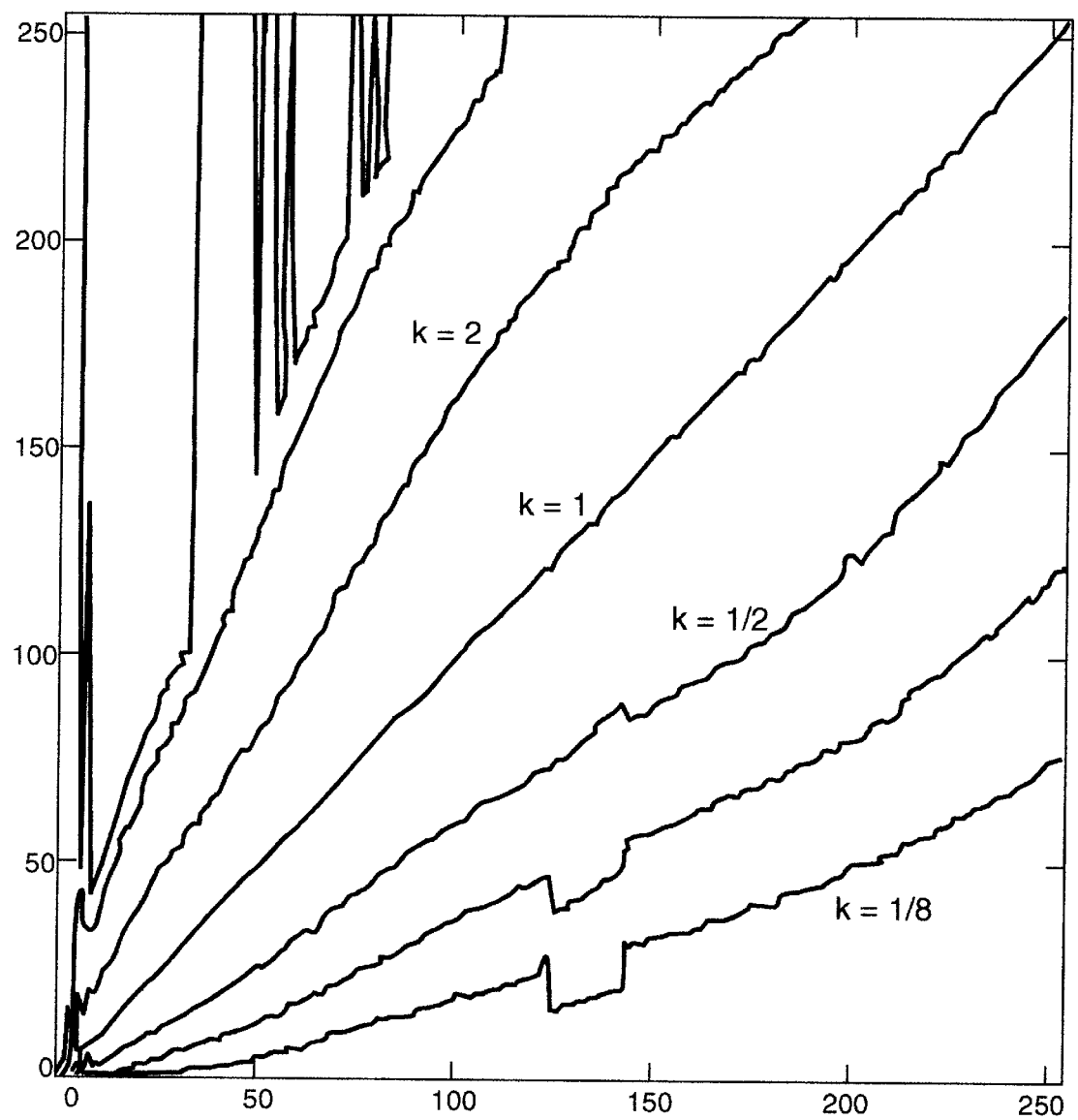

Accordingly, a cross histogram can be "slenderized" into a parametric plot, equivalent to the cross histogram one would obtain were the images free of noise, through estimation. In FIG. 6A, the plots were crudely estimated merely by selecting the largest bin count from each row or column of a cross histogram (which is generated computationally in a conventional fashion). The parametric plots shown in FIG. 6B were estimated more robustly by choosing the first moment across each row or column of a cross histogram and enforcing a monotonicity constraint. FIG. 6C illustrates the operation of the step-by-step procedure for low-noise images discussed above in terms of the parametric plot of $f(kq)$ against $f(q)$.

Ordinarily, k is known because the conditions under which the images were obtained is known. For example, if the two images are created by exposure bracketing, the bracketed range represents k; thus, if the images are one stop apart, k=2, while if two stops apart, k=4, etc. However, because of the characteristic relationship between the shape of the cross histogram and the degree of exposure difference between the compared images (which, as shown in FIG. 6A, can be observed even with a crude estimate), obtaining the cross histogram allows an approximate measure of k to be made.

3. Image Registration

The techniques heretofore described assume that the images are in perfect register, so that correspondingly located pixels of each source image represent the same subject matter. If this is not the case, the approach disclosed in copending application Ser. No. 08/558,012 (entitled METHOD AND APPARATUS FOR RELATING AND COMBINING MULTIPLE IMAGES OF THE SAME SCENE OR OBJECT(S) and filed on Nov. 13, 1995), commonly owned with the present application and hereby incorporated by reference, may be used to place the images into register (even if the images reflect different camera orientations) so that the invention may operate on common subject matter in each of the component images. Briefly, the '012 application discloses a featureless approach to relating images to one another using a projective coordinate transformation, utilizing spatiotemporal derivatives of a pixel parameter (such as brightness, luminance or color) to obtain a "projective flow" or "projective fit" model of coordinate transformation. For a given input image frame, the model defines the universe of possible changes in each image point consistent with the projective coordinate transformation, and is used to find the transformation parameters which, when applied to the input image, make it look most like a target image. The projective model used in the invention correctly relates images of common (static) subject matter taken by a single camera at a fixed location, free to rotate about its center of projection (e.g., free to rotate about its optical axis, and to pan and tilt) and having a lens free to zoom; and planar scenes recorded by a camera free to move arbitrarily (including translation or other movements of the center of projection itself). Accordingly, the invention disclosed in the '012 application extends the techniques of optical flow and optical fit to estimation of projective coordinatetransformation parameters.

Projective fit assumes that each point in a first image or image region can be related to a corresponding point in a second image according to a projective coordinate transformation model. With this approach, the pixels of both images are compared to identify point correspondences, and the degree and direction of displacement between corresponding points (the "flow velocity") is determined. Parameters of the chosen transformation model that "explain" each displacement are then computed. The "projective flow" procedure does not require point-to-point correspondences. Instead, the change in a pixel parameter (e.g., brightness) from one image to another is assessed at each pixel position, and the global set of changes is used to compute a best-fit coordinate transformation that accounts for these changes.

The techniques disclosed in the '012 application are applicable over a wide range of resolutions. However, as explained therein, it is preferred to analyze images iteratively, at multiple resolutions levels. Coarsely sampled images are first analyzed to ensure the presence of common subject matter. Further iterations at progressively finer resolutions approximate the projective (or "homographic") coordinate transformation relating the two images with increasing accuracy. Iterative processing is preferably also used at each level of resolution in the estimation procedure itself.

4. Applications and Variations

An important advantage of the present invention is the ability to control the manner in which the various component images are combined. In a preferred embodiment, the user is accorded the ability to alter certain global image parameters, or local image parameters within a selected portion of the image, that affect the component images or their combination.

As set forth earlier, the component images are combined by weighting in accordance with the associated certainty functions. The user, however, can be permitted to alter this weighting, thereby exerting control over the tonality of the final image. For example, by biasing the weighting toward overexposure (i.e., higher pixel brightness levels), the user obtains an image with more detail than would appear in a single overexposed image, but still appearing somewhat-washed out if that is the desired effect.

With the effective response curves established for two or more images, a hypothetical intermediate image can be generated; in other words, instead of blending images, the user can reconstruct an image very much like the one that would have resulted if it had been taken at an intermediate exposure. This is accomplished by establishing, from the actual effective-respose curves, a hypothetical curve representing the intermediate exposure, and modifying the actual pixel values of the output image so as to be consistent with the intermediate curve. The hypothetical curve is straightforwardly generated so long as k—the exposure difference between the images—is known, in which case the intermediate curve may, for example, be established through interpolation between the two nearest curves. If the effective exposure curves for the actual images are known analytically, of course, the intermediate curve can itself be generated analytically.

The source image and/or the final composite image can also be filtered in various ways. For example, using a homomorphic filtering operation, the nonlinearity inherent in the sensor response is reversed, and the filtering is carried out in the natural-light domain. After filtering, the inverse of the preprocessing function may be applied, restoring the original nonlinearity. Other nonlinearities may also be applied to the output image.

Another useful filtering operation, well known in the art, is gamma correction, which alters the contrast of the image (effectively altering the slope of the steep region of the characteristic curve). Gamma correction is applied on a pixel-by-pixel basis, either throughout the image or over a selected local area. For example, in an eight-bit system where each pixel can assume a brightness value of zero (dark of "turned off") to 255 (brightest), a suitable gamma-correction function is $$P_{out} = \frac{255}{255^{\frac{1}{\gamma}}} P_{in}^{\frac{1}{\gamma}}$$

where $P_{in}$ is the original pixel value, $P_{out}$ is the gamma-corrected pixel value, and $\gamma$, the degree of correction, is selected by the user. The main problem with gamma correction, in the context of the prior art, is its tendency to accentuate shadow detail when $\gamma>1$ and accentuate highlight detail when $\gamma<1$, resulting in loss of information and degradation of the image. When used with the output image produced in accordance with the present invention, by contrast, image quality remains high. This capability allows construction of a "virtual" camera with many adjustments that may be applied over a wide range after a picture is taken.

Figure 7A:
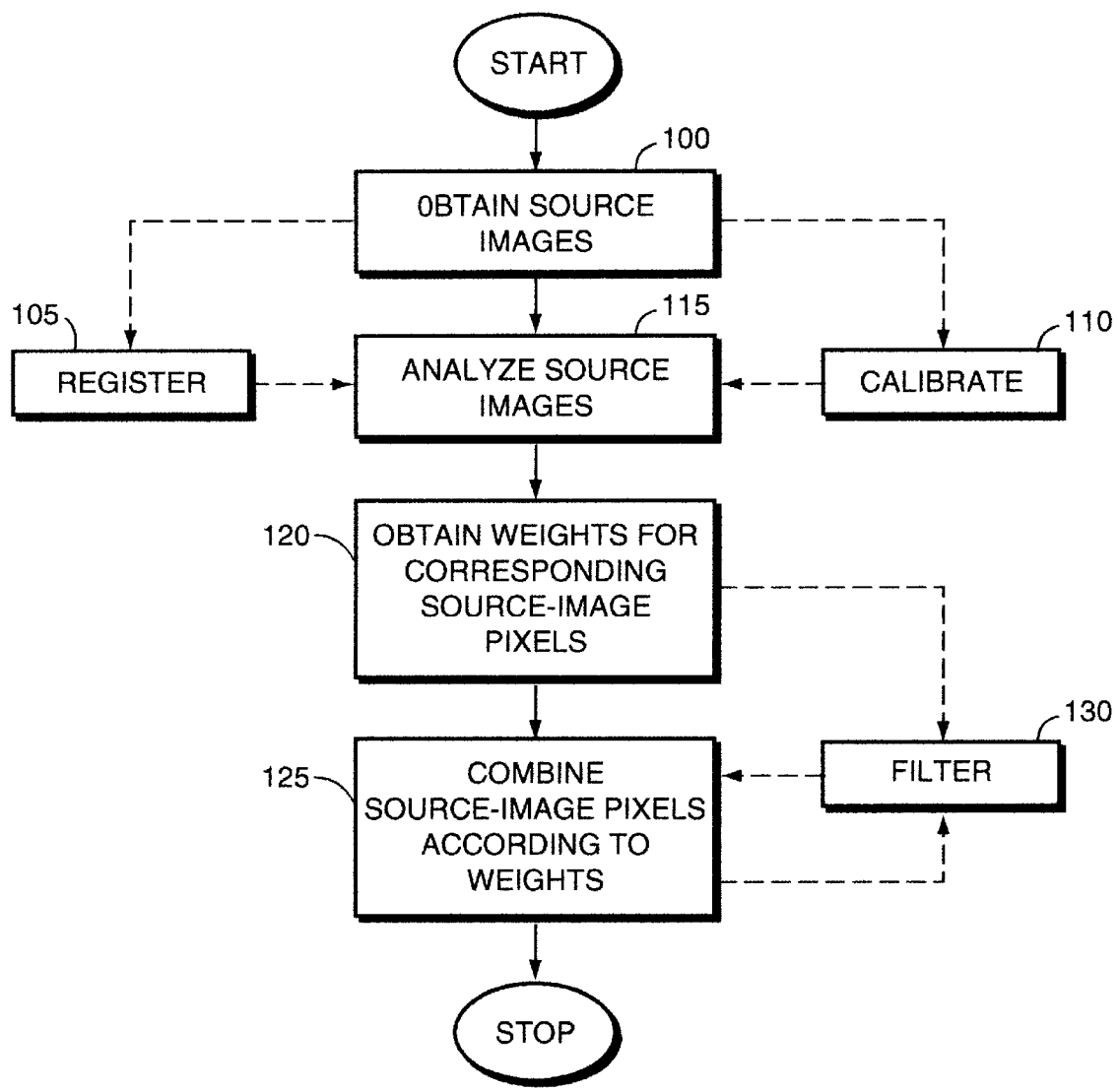
FIG. 7A is a flow chart illustrating overall operation of the invention.
Figure 7B:
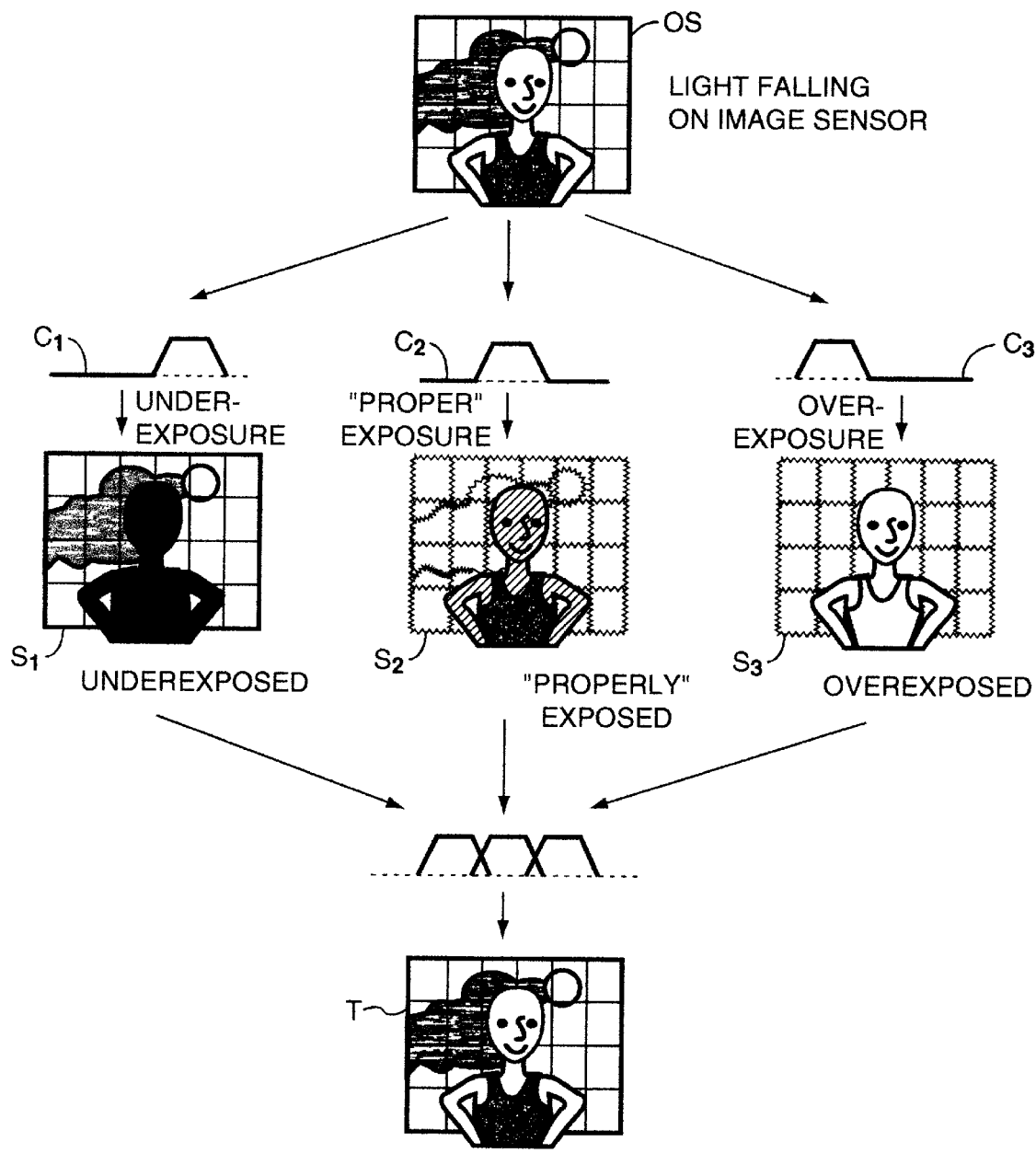
FIG. 7B schematically depicts overall operation of the invention.

FIGS. 7A and 7B together illustrate the operation of the method of the invention. In a first step 100, three differently exposed source images, $S_1$, $S_2$, $S_3$, of an Original Scene OS are obtained. Source image $S_1$ is underexposed overall but well-exposed for highlight image areas; source image $S_2$ is "properly" exposed for the overall scene, representing the best compromise exposure, although only certain scene portions (such as the person's shirt) are acceptably exposed; and $S_3$ is overexposed overall but well-exposed for the heavily backlit person. If necessary, the source images are registered in step 105 and non-overlapping subject matter discarded or retained with lesser ultimate modification. If effective exposure response curves are not available for the source images, these are obtained in a calibration step 110.

In step 115, certainty functions $C_1$, $C_2$, $C_3$ are generated for each source image $S_1$, $S_2$, $S_3$, respectively. Ordinarily, this is accomplished by determining the camera's pointwise response function for each image using the calibration procedure discussed above, and differentiating the resulting set of functions; if k is known, only a single response curved is obtained and differentiated, since the remaining curves will be displaced from the computed curve by multiples of k. For each pixel of a target image buffer T, corresponding pixels from each source image are identified, and weights assigned thereto in accordance with the certainty functions (step 120). Finally, in step 125, the source-image pixels are combined according to the weights, and the weighted value introduced into the target buffer pixel location. Steps 120 and 125 are repeated for all pixels of the target image buffer. If desired, a filtering step 130 can be applied to one or more of the source images and/or to the final composite image. In addition, the pixel depth can be augmented to permit intermediate values generated by the combination process to be rendered explicitly (rather than quantized to the next higher or lower allowed pixel value), or at least approximated with greater precision. Furthermore, instead of creating a new composite image from the source images, one of the source images can be loaded into buffer T, and differently exposed portions of one or more other source images added thereto. For example, highlight detail from a relatively light image can be introduced into a relatively dark image to brighten the highlights while retaining the overall darker tonality of the dark image, and vice versa. Alternatively, a composite image can be constructed from relatively dark pixels of a lighter image and relatively light pixels of a darker image by increasing the pixel values of the darker image (and/or decreasing the pixel values of the lighter image) in accordance with an increase/decrease schedule derived from the cross histogram of the two image, or from the camer's response function.

Figure 8:
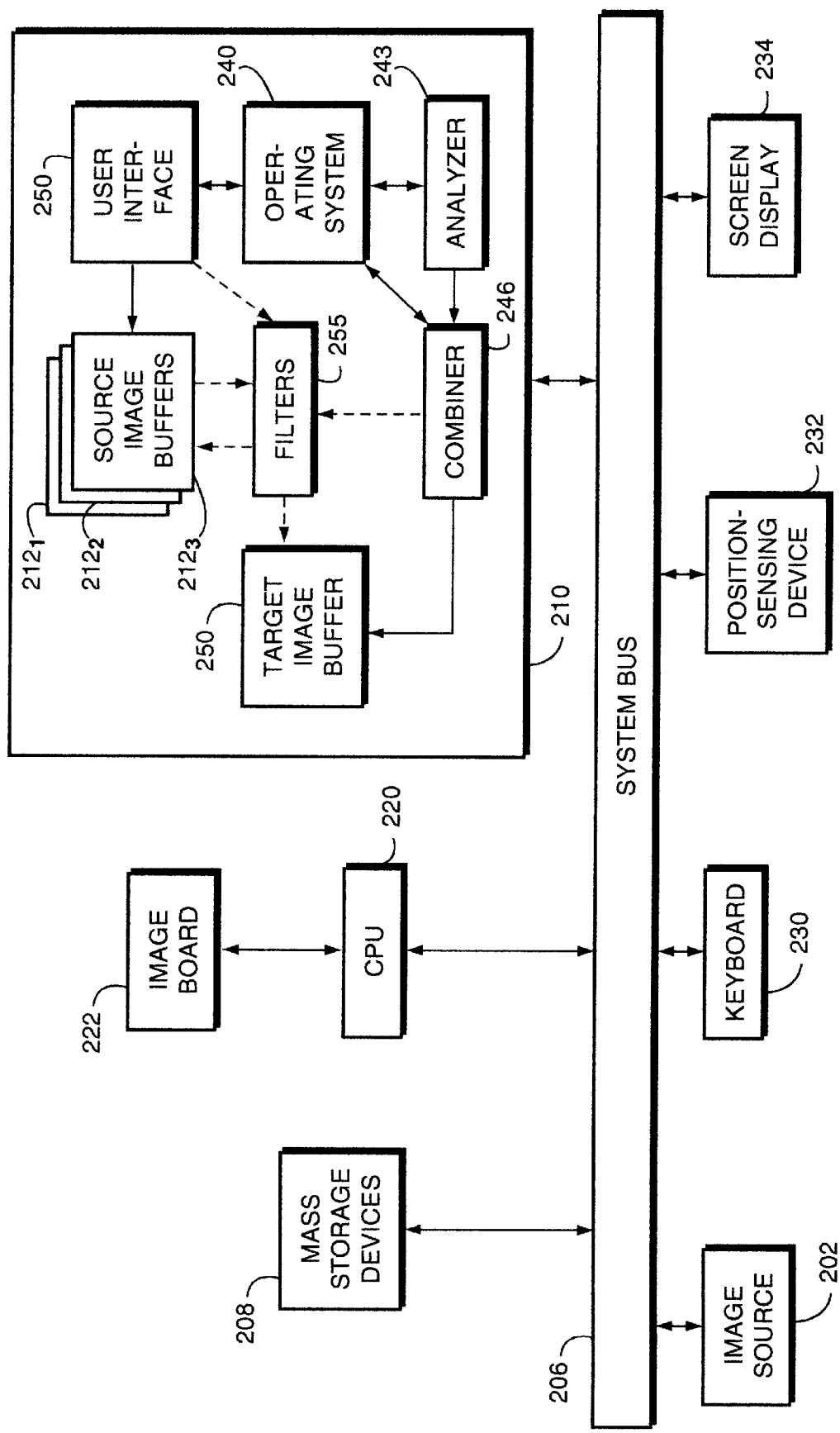
FIG. 8 schematically illustrates a representative hardware environment for the present invention.

Refer now to FIG. 8, which illustrates, in block-diagram form, a hardware system incorporating a preferred embodiment of the invention. As indicated therein, the system includes an image source 202 (e.g., a still video camera or a digital scanner), which supplies input images to be analyzed. The output of source 202 is a pixelmap, which is sent as a bitstream on a system bus 206 over which all system components communicate, and may be stored in a mass storage device (such as a hard disk or optical storage unit) 208 as well as in a main system memory 210 (specifically, within a partition defining a series of input image buffers capable of storing a sequence of video frames, and representatively denoted by reference numerals $212_1$, $212_2$, $212_3 \ldots$ ).

The operation of the illustrated system is directed by a central-processing unit ("CPU") 220. To facilitate rapid execution of the image-processing operations hereinafter described, the system preferably contains dedicated image-processing hardware 222; this is a standard component well-known to those skilled in the art.

The user may interact with the system using a keyboard 230 and a position-sensing device (e.g., a mouse) 232. The output of either device can be used to designate information or select particular areas of a screen display 234 to direct functions to be performed by the system.

The main memory 210 contains a group of modules that control the operation of CPU 220 and its interaction with the other hardware components. An operating system 240 directs the execution of low-level, basic system functions such as memory allocation, file management and operation of mass storage devices 208. At a higher level, an analyzer module 243 and combiner module 246, each implemented as a series of stored instructions, direct execution of the primary functions performed by the invention, as discussed below; and instructions defining a user interface 250 allow straightforward interaction over screen display 234. User interface 250 generates words or graphical images on display 234 to prompt action by the user, and accepts user commands from keyboard 230 and/or position-sensing device 232.

The contents of each image buffer 212 define a "raster", i.e., a regular two-dimensional pattern of discrete pixel positions that collectively represent an image and may be used to drive (e.g., by means of image-processing board 222 or an image server) screen display 234 to display that image. The contents of each memory location in a frame buffer directly govern the appearance of a corresponding pixel on display 234.

It must be understood that although the modules of main memory 210 have been described separately, this is for clarity of presentation only; so long as the system performs all necessary functions, it is immaterial how they are distributed within the system and the programming or hardware architecture thereof. Likewise, although conceptually organized as grids, pixelmaps need not actually be stored digitally in this fashion. Rather, for convenience of memory utilization and transmission, the raster pattern is usually encoded as an ordered array of pixels.

As noted above, execution of the key tasks associated with the present invention are directed by modules 243, 246, which govern the operation of CPU 220 and control its interaction with main memory 210 in performing the steps associated with image analysis and combination. Thus, in a representative implementation, a series of differently exposed source images are stored in buffers $212_1$, $212_2$, $212_3$. Analyzer module 243 generates response curves and certainty functions associated with the source images or, as an alternative to estimating the response function, selects a reference frame and matches a histogram to the reference frame using a "generic" certainty function (e.g., any curve suitably peaked in the middle). Combiner module 246 then combines pixels from each of the source images by weighting correspondingly located pixels in accordance with the certainty functions, loading the resulting pixel values into a target image buffer 250 whose contents are shown on screen display 234. If the source images are not aligned, analyzer module 243 registers them using a coordinate transformation. Preferably, analyzer module 243 featurelessly approximates the parameters of a projective coordinate transformation that spatially relates, in pairs of source images, corresponding subject matter, and then applies the parameters to one or both of the images to thereby coordinate transform it into an image that is spatially consistent with the other image or to transform both images into a separate but spatially consistent space where common subject matter is in register.

User interface 250 is preferably configured to permit the user to modify the displayed image by activating one or more filters 255 (the dashed lines indicating the optional nature of this feature). In particular, interface 250 desirably provides graphical representations of a series of "slider" switches, manipulation of which (using mouse 232) alters a global or local image characteristics. In the case of corrections operating on the source images, the filters alter data in source-image buffers 212₁, 212₂, 212₃ in accordance with the filter function. The filters 255 can also affect operation of combiner 246, e.g., by permitting the user to alter the weights applied to the component images. Finally, operations such as gamma correction are applied to the displayed image residing in target-image buffer 250, or equivalently incorporated into the process of arriving at ("rendering") the output image.

It should be stressed that this implementation is exemplary only. Other hardware approaches are possible—for example, the various modules of the invention can be implemented on a general-purpose computer using appropriate software instructions, or as hardware circuits, or as mixed hardware-software combinations (wherein, for example, pixel manipulation and rendering is performed by dedicated hardware components). Indeed, the invention is not limited to operations on discretely represented digital images. Instead, the foregoing techniques can be applied to continuous images represented in analog form, using, for example, contrast masks to combine source images.

Furthermore, the differently exposed images need not arise from different camera exposures. Instead, the various source images can represent different color channels (e.g., red, green and blue) from a digital camera, or differently filtered exposures of the same scene taken with a film camera. The red channel or redfiltered image, for example, would provide better sky and cloud detail than the other images. The differently colored source images can be combined, as discussed above, into one grayscale image of a single color.

It will therefore be seen that the foregoing represents a highly flexible and effective approach to generating high-quality images that exhibit both large dynamic ranges and capture subtle variations in exposure. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of combining a plurality of differently exposed source images of the same object or scene, the method comprising the steps of:
    a. establishing a response function characterizing the source images in terms of values of a response parameter and exposures producing the values; and
    b. based on the response function, combining the source images into a composite image comprising image detail from each of the source images and having a greater range of image detail than any of the source images
   wherein
    c. the source and composite images each comprise an ordered array of pixels;
    d. the pixels of the composite image correspond to the pixels of the source images; and
    e. the images are combined by assigning, to each composite-image pixel, a pixel-parameter value representing a weighted average of the pixel parameter of corresponding pixels from the source images obtained by:
        i. for each source image, generating a certainty function characterizing a tonal range of greatest image detail; and
        ii. for each composite-image pixel, (A) weighing the corresponding pixels from the source images in accordance with the certainty functions, (B) combining the pixel-parameter values of the corresponding source image pixels in accordance with the weighting, and (C) assigning the combined pixel-parameter value to the composite-image pixel.

2. The method of claim 1 wherein the response parameter is luminance.

3. The method of claim 1 further comprising the step of registering the source images.

4. The method of claim 3 wherein the registering step comprises:
    a. featurelessly approximating parameters of a projective coordinate transformation that spatially relates, in first and second images source, pixels corresponding to common subject matter therebetween;
    b. applying the parameters to the first source image to thereby transform it into a processed image, the common subject matter encoded by pixels in the processed image being substantially spatially consistent with the common subject matter encoded by pixels in the second source image; and
    c. aligning the images by combining the pixels corresponding to the common subject matter; and
    d. repeating steps (a) to (c) until all source images are aligned.

5. The method of claim 1 further comprising the step of obtaining a user input, the pixel parameters being weighted according to said input.

6. The method of claim 1 wherein the composite image has highlight, midtone and shadow areas, and the weighted average is varied for pixels in at least one of the areas.

7. The method of claim 1 wherein the response function is established according to steps comprising:
    a. identifying a shadow-region pixel from a first source image, the shadow-region pixel having an image location and an associated pixel parameter;
    b. identifying, in a second source image, a corresponding second-image pixel having the same image location as the shadow-region pixel and having an associated pixel parameter;
    c. identifying, in the first source image, a first-image pixel having an associated pixel parameter equal to that of the second-image pixel;
    d. identifying, in the second source image, a corresponding second-image pixel having the same image location as the first-image pixel;
    e. repeating steps (c) and (d); and
    f. deriving the response function through comparison of the pixel parameters of the pixels identified in the first source image with the pixel parameters of the pixels identified in the second source image.

8. The method of claim 1 wherein the step of generating the certainty function comprises differentiating the response function.

9. The method of claim 1 wherein the images correspond to different color channels of the same image, and the composite image is rendered in a single color.

10. Apparatus for combining a plurality of differently exposed source images of the same object or scene, the apparatus comprising:
    a. analysis means for establishing a response function characterizing at least one of the source images in terms of values of a response parameter and exposures producing the values;
    b. combining means for combining, based on the response function, the source images into a composite image comprising image detail from each of the source images and having a greater range of image detail than any of the source images; and c. a computer memory for storing images as ordered sets of pixels each having at least one associated pixel parameter;

wherein d. the analysis means establishes a response function characterizing at least one of the source images in terms of values of a pixel parameter and exposures producing the values, and is configured to generate, for each source image, a certainty function characterizing a tonal range of greatest image detail; and e. the combining means is configured to (i) weight the corresponding pixels from the source images in accordance with the certainty functions, (ii) combine the pixel-parameter values of the corresponding source image pixels in accordance with the weighting, and (iii) store the combined pixel-parameter value in the computer memory as a displayable value.

11. The apparatus of claim 10 wherein the pixel parameter is luminance.

12. The apparatus of claim 10 wherein the analysis means is further configured to register the source images.

13. The apparatus of claim 10 wherein the analysis means is configured to establish the response function by:

a. identifying a shadow-region pixel from a first source image, the shadow-region pixel having an image location and an associated pixel parameter;

b. identifying, in a second source image, a corresponding second-image pixel having the same image location as the shadow-region pixel and having an associated pixel parameter;

c. identifying, in the first source image, a first-image pixel having an associated pixel parameter equal to that of the second-image pixel;

d. identifying, in the second source image, a corresponding second-image pixel having the same image location as the first-image pixel;

e. repeating steps (c) and (d); and f. deriving the response function through comparison of the pixel parameters of the pixels identified in the first source image with the pixel parameters of the pixels identified in the second source image.

14. The apparatus of claim 10 wherein the analysis means generates the certainty function by differentiating the response function.

15. The apparatus of claim 10 wherein the analysis means is further configured to generate an image of exposure intermediate between two of the source images by (i) generating a response function intermediate to response functions associated with the two source images and (ii) modifying one of the source images to conform to the intermediate response function.

16. The apparatus of claim 10 further comprising a selectably actuable filter for modifying the composite image.

* * * * *